June 23, 1970  RYOSUKE YOKOTA ET AL  3,516,939

VITREOUS COMPOSITION FOR MEASURING NEUTRON FLUENCE

Filed Jan. 15, 1968

Ryosuke Yokota
Yuhei Muto
Saburo Nakajima
BY Kiyoshi Fukuda

INVENTORS

George B. Oujevolk
Attorney

United States Patent Office 3,516,939
Patented June 23, 1970

3,516,939
VITREOUS COMPOSITION FOR MEASURING NEUTRON FLUENCE
Ryosuke Yokota and Yuhei Muto, Yokohama-shi, Saburo Nakajima, Kawasaki-shi, and Kiyoshi Fukuda, Yokohama-shi, Japan, assignors to Tokyo Shibaura Electric Co., Ltd., Kawasaki-shi, Japan, a corporation of Japan
Filed Jan. 15, 1968, Ser. No. 697,825
Claims priority, application Japan, Jan. 17, 1967, 42/2,909; Nov. 18, 1967, 42/73,901
Int. Cl. C09k 3/00
U.S. Cl. 252—301.1      5 Claims

ABSTRACT OF THE DISCLOSURE

A vitreous composition sensitive to the neutron fluences which comprises an alkali metal metaphosphate, a metal metaphosphate and an oxide of fissile material. When the vitreous composition is exposed in neutron fluences and then treated by a proper etching agent, there are formed a number of recesses on the surface of the vitreous composition.

---

Figure 1:
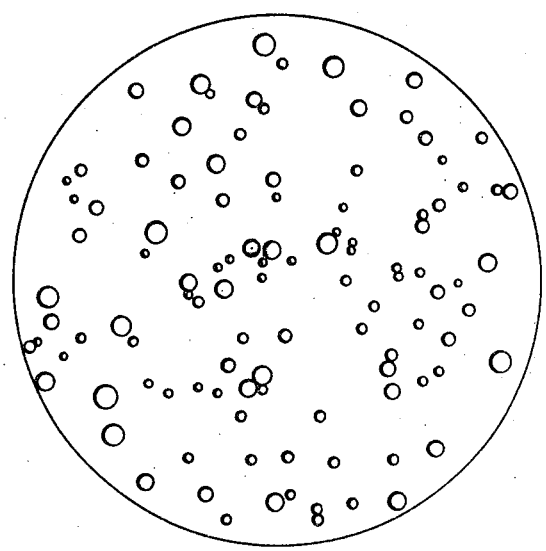

The present invention relates to a vitreous composition sensitive to neutrons.

Heretofore, the measurement of a neutron fluence has been performed by using photographic film. When the photographic film is exposed to neutrons there is formed a latent image therein due to the impingement of neutron particles. It has been common practice to develop the latent image consisting of aggregates of small dots and to count the number thereof so as to determine the neutron fluence received by the photographic film. However, it has been known that the photographic film is incapable of carrying out the accurate measurement of a neutron fluence, particularly high energy fast neutrons due to disturbances in the latent image caused by the rebounding impingement of neutron particles on the hydrogen atom contained in the film emulsion, and the indistinctness of the latent image produced under high temperature and humidity, or other causes. Another known method is by the use of a neutron detector consisting of a substrate of dielectrics, such as plastics, ordinary glass and metaphosphates glass, and a layer of a fissile material such as uranium and thorium, which is capable of nuclear fission by neutron impingement, formed on the surface of the substrate. The mechanism of the detector is such that the energies generated from the fissile nuclide fissured by neutrons cause scars on the surface of the substrate physically or chemically. When brought into contact with an etchant, the scarred parts thus formed in the surface of the substrate are more quickly dissolved in the etchant than the other parts of the substrate. Thus there are formed in the surface of the substrate depressions, namely etch pits in a corresponding number to the amounts of neutron fluences received by the detector. Generally a fissile substance, however, is a radioactive material emitting harmful radiations, so that the use of the aforementioned detector having such radioactive substance coated on the surface thereof is always accompanied with danger.

According to the present invention, there is provided a vitreous composition which essentially consists of an alkali metal metaphosphate selected from the group consisting of lithium metaphosphate, sodium metaphosphate and potassium metaphosphate, a metal metaphosphate selected from the group consisting of zinc metaphosphate, calcium metaphosphate, magnesium metaphosphate and aluminium metaphosphate, and an oxide of fissile material selected from the group consisting of thorium oxide, uranium oxide, plutonium oxide and neptunium oxide.

Throughout the vitreous composition of the present invention, there is uniformly distributed a fissile material introduced in the form of an oxide, so that the radiations emitted from the fissile material are attenuated or absorbed while passing through the vitreous body and the amounts of radiations released outside of the vitreous body are negligibly minute. It has also been found that this vitreous composition is substantially insensitive to the alpha, gamma and X-rays, but sensitive to neutrons, particularly fast neutrons which are possessed of great energies and consequently harmful to the human body.

Further, the sensitivity to neutrons of the vitreous composition varies with the magnitude of neutron energies, and the extent of these variations in the sensitivity to neutron energies depends on the kinds and proportions of the components used.

Figure 2:
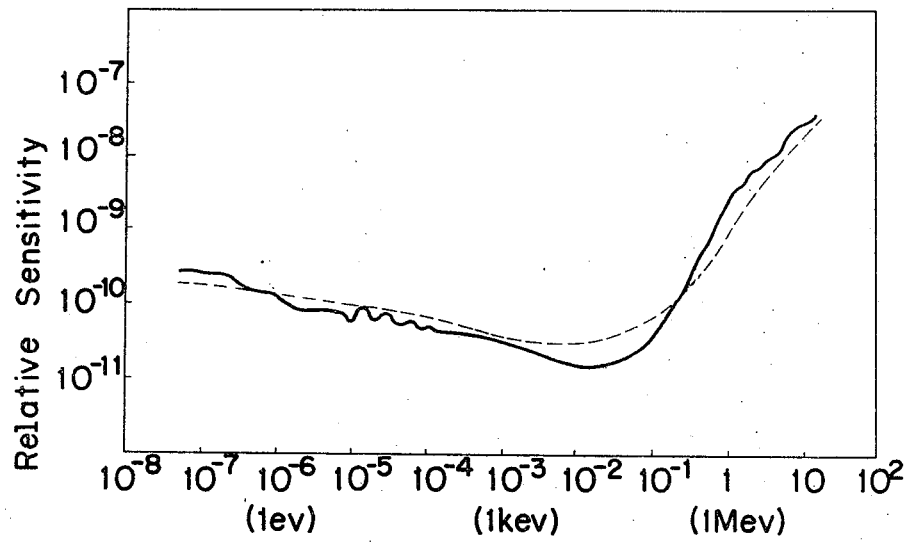

In the drawing:

FIG. 1 is a microphotographic representation of the surface of the vitreous compositions after it has been subjected to neutron bombardment and subsequent etching; and FIG. 2 is a curve diagram showing the sensitivity of a vitreous composition prepared according to the present invention.

A vitreous composition prepared from alkali metal metaphosphates, metal metaphosphates and oxides of fissile materials according to the present invention is more sensitive to neutrons, particularly fast neutrons than the prior art detector. Although the reason is not fully understood, it is believed that the energies generated by the neutron bombardment of fissile materials are effectively directed to denaturating of the metaphosphate vitreous components laying close by. When the vitreous body exposed to neutrons is treated with a proper etchant, for example, sodium hydroxide, potassium hydroxide, hydrofluoric acid or mixtures of hydrofluoric acid and sulfuric acid, there are formed in the surface of the vitreous body minute depressions, that is, etch pits. Since the number of the etch pits is directly proportional to that of the neutron particles received by the vitreous body, the counting of the etch pits will provide an accurate determination of a neutron fluence.

The fact that a fissile substance constitutes one of the vitreous components affords some advantages in addition to the improved sensitivity. The first of these advantages is that, since the fissile substance is surrounded with other other vitreous metaphosphate components, the radiations released by the spontaneous fission of the fissile substance itself are attenuated or absorbed by these metaphosphate components and do not pass through the vitreous body. Thus its handling is very safe and easy.

The second is that the inclusion of two or more kinds of fissile material enables the sensitivity to neutrons of the vitreous composition, as well as variations in such sensitivity with the magnitude of neutron energies, to be controlled within the prescribed range. Generally, the minimum magnitude of neutron energies required in the fissure of a fissile substance by neutron bombardment changes with the kind of nuclear species. For instance, $^{233}U$, $^{235}U$ and $^{239}Pu$ are capable of being fissured even by the least neutron energies (for example, 0.025 ev.), whereas $^{232}Th$ is not fissured by thermal neutrons, but requires the bombardment of fast neutrons having far greater energies to be applied for its fission. Thus the detector according to the present invention which comprises several kinds of fissile material having different magnitudes of neutron energy displays diverse sensitivity characteristics in accordance with their proportions. If any of the sensitivity characteristics is sufficiently high to immediately respond to such intense neutron energies as will seriously affect the human body, then readings on the detector will directly represent the neutron danger to human body. Moreover with the vitreous detector of the present invention, it is easy to incorporate the kinds and proportions of fissile material which will afford such high sensitivity properties as will prevent harmful neutron effects on the human body.

In the vitreous composition of the present invention, a first component consists of at least one of the compounds selected from lithium metaphosphate, sodium metaphosphate and potassium metaphosphate, and a second component is formed from at least one of the compounds selected from zinc metaphosphate, calcium metaphosphate, magnesium metaphosphate and aluminium metaphosphate. These two groups of metaphosphates are already known as constituents of a vitreous composition for measuring radiation dosage. It is also known that a vitreous composition including silver or compounds thereof is sensitive to radiations. When the silver-containing vitreous metaphosphate composition is exposed to radiations there will be formed fluorescent centers therein. When excited by ultraviolet rays, these fluorescent centers become luminescent, so that this silver-containing vitreous metaphosphate detector can be conveniently used in the determination of doses of general radiations. However, it is not sensitive to neutrons, particularly fast neutrons, so that it is unsuitable for the detection of neutron fluences.

In the vitreous composition of the present invention, the above-listed alkali metal metaphosphates account for 8 to 60 percent by weight on the basis of the total amount of the alkali metal metaphosphate and metal metaphosphate taken as 100 percent, then the metal metaphosphate is incorporated in proportions ranging from 92 to 40 percent. If the proportion of the alkali metal metaphosphate is less than 8 percent it will be difficult to obtain the desired final vitreous product. Conversely, the use of the alkali metal metaphosphate in proportions in excess of 60 percent will result in a product of low humidity resistance due to the great affinity for water of the material.

Variations in the relative proportions of the alkali metal metaphosphates and metal metaphosphates also have a bearing on the sensitivity of the vitreous composition prepared therefrom. The best sensitivity will be obtained when the alkali metal metaphosphates and metal metaphosphates are used in approximately equal proportions, though the sensitivity may somewhat vary with the kinds of compounds involved.

In addition to the aforementioned metaphosphates, the vitreous composition of the present invention includes at least one of the oxides of thorium, uranium, plutonium and neptunium. While addition of increased proportions of these oxides of fissile material usually improves the sensitivity of the detector, additions in excess of certain limits have been found to reduce the sensitivity. Experiments show that the proportions to obtain the highest sensitivity of the detector vary with the kinds of fissile material employed, namely, about 40 percent by weight for thorium oxide, and smaller proportions, generally 20 to 30 percent by weight for oxides of uranium, neptunium and plutonium. Practical ranges of additions are 2 to 60 percent by weight, or preferably 20 to 40 percent by weight for thorium oxide, 0.1 to 30 percent by weight, or preferably 0.2 to 20 percent by weight for uranium oxide and 0.3 to 20 percent by weight for both neptunium oxide and plutonium oxide.

On the other hand, the nuclear species of fissile material introduced into the vitreous detector of the present invention is also associated with its relative sensitivity to the magnitude of neutron energies emitted. For example, a vitreous composition containing thorium in the oxidised form has low sensitivity to thermal neutrons or those having almost as low energies but displays high sensitivity to high energy fast neutrons. In contrast, a vitreous detector including uranium has good sensitivity to thermal neutrons, though it is less sensitive to fast neutrons. And the sensitivity characteristics of a vitreous detector containing plutonium or neptunium resemble those of the detector containing thorium oxide.

Therefore, the nuclear species of fissile material to be introduced into a vitreous detector should be selected in accordance with the magnitude of a neutron fluence and the response to the neutron energy which it is desired to detect or measure. The reason is that the use of the right kind of vitreous detector which has a proper sensitivity to the magnitude of neutron energy to be detected or measured will naturally enable an accurate determination to be made by short time exposure.

The fact that the use of different nuclear species of fissile material in a vitreous detector causes variations in its sensitivity characteristics can be suitably utilised in the control of these properties. For example, a vitreous detector containing only thorium oxide is particularly sensitive to fast neutrons, whereas the one including uranium in the oxide form alone is specifically sensitive to thermal neutrons. Thus a vitreous detector comprising both thorium and uranium oxide has a broad range of sensitivity covering the energies of from thermal to fast neutrons. Namely, the proportions of these two kinds of fissile material govern the sensitivity characteristics of a vitreous detector formed therefrom. Therefore the control of the sensitivity characteristics of a vitreous detector is a suitable means for immediately finding the effect of neutrons on an exposed object.

In FIG. 2, there is shown the sensitivity of a vitreous detector which has been so adjusted as to have a sufficient magnitude to detect the harmful effects of neutron energies on the human body, in which the curve denoting the degree of danger to the human body is represented by a dotted line and the curve showing the sensitivity of a vitreous detector is indicated by a solid line. This sensitivity curve was obtained from a vitreous detector covered with a protective coating of cadmium which contained 37.5% by weight of thorium oxide and 6.0% by weight of uranium oxide. As clearly seen from the figure, the sensitivity curve of the detector displays excellent agreement with the curve of human hazards.

For improved solubility, the vitreous composition of the present invention may include an additive, for example, lead metaphosphate, barium metaphosphate, strontium metaphosphate, boron oxide, silicon oxide or aluminium oxide in proportions not exceeding 10 percent by weight.

The number of etch pits formed in the surface of a vitreous detector of the present invention which has been subjected to etching after neutron bombardment substantially represents the sensitivity of the detector to the magnitude of neutron energies applied. In fact, however it does not necessarily follow that the etch pits are always produced in the exact number to indicate the neutron fluence actually applied. However, the differentials between the number of the neutrons emitted and that of the etch pits produced are considered to fall within certain limits. Therefore the counting of these etch pits enables the number of the neutrons actually applied to the detector to be estimated. If the number of etch pits obtained in a given case is corrected in accordance with a previously prepared calibration curve showing the relations of the numbers of neutrons and etch pits, then the detector will be capable of measuring with substantial ease and accuracy the neutron fluence it has actually received. As illustrated in FIG. 1, the etch pits are deep depressions and so easily countable. FIG. 1 is also a 100-fold magnified microphotographic representation of the surface of the detector on which there are formed etch pits.

The vitreous composition of the present invention is prepared by melting mixtures of the components at a temperature approximately ranging, for example, from 1150 to 1200° C. and fabricating the mass into the desired form and thereafter cooling it for solidification. Since the melt has great fluidity at the time of heating, it can be formed into an extremely thin plate, for example, 1 mm. or less thick. This vitreous detector emits radiations due to the spontaneous fission of the fissile material contained therein, though their amounts are very small. To avoid the harmful effects which the radiations might exert on the human body, the vitreous detector is preferably coated with a substance such as lead or zinc which is permeable to neutrons, but not to other radiations. Such protective covering increases the safety of the subject detector, thus making it particularly adapted for use in an individual monitor to be carried by men for measuring the neutron fluence which they will receive during a certain length of time.

The present invention will be more clearly understood from the following specific examples in which all parts are by weight.

EXAMPLE 1

A mixture of 40 parts of lithium metaphosphate, 10 parts of magnesium metaphosphate, 50 parts of aluminium metaphosphate and 65 parts of thorium oxide was thermally melted in a crucible at a temperature of about 1150° C. The melt was pressed into a thin plate between two boards. After annealing, the surface of the material was ground smooth until its thickness was reduced to 1 mm.

The vitreous plate detectors thus obtained were exposed for a certain length of time of fast neutrons (14.1 mev.) of different fluences and thereafter subjected for one minute to etching by a 28% aqueous solution of sodium hydroxide. It was confirmed that the number of etch pits per unit area was in a linear relation to the neutron fluence applied within a range of from $10^6$ n./cm.$^2$ to $10^{12}$ n./cm.$^2$.

EXAMPLE 2

A mixture of 30 parts of lithium metaphosphate, 5 parts of barium metaphosphate, 42 parts of zinc metaphosphate, 23 parts of aluminium metaphosphate, 37.4 parts of thorium oxide and 6 parts of uranium oxide was melted at a temperature of 1150° C. The melt was spread in thin layers over the surface of a vitreous metaphosphate plate formed from 27 parts of lithium metaphosphate, 23 parts of magnesium metaphosphate and 50 parts of aluminium metaphosphate and pressed with a separate board from the above. After annealing, the surface of the material was ground into a thin layer 0.05 mm. thick.

The detectors consisting of the aforementioned substrate and a neutron-sensing layer were exposed, as in Example 1, for a certain length of time to neutrons (14.1 mev.) from a source thereof having different fluences and immersed for 5 minutes for etching in an aqueous solution of 28% sodium hydroxide kept at 60° C. It was confirmed that there was established a linear relation between the neutron fluences applied within a range of from $10^3$ n./cm.$^2$ to $10^7$ n./cm.$^2$ and the number of etch pits formed on the surface of the vitreous detector.

EXAMPLE 3

Seven vitreous detectors respectively having different proportions and components were prepared in accordance with the following table. Each mixture was melted at a temperature of about 1150° C., and fabricated under the same conditions as in Example 1 into a plate 1 mm. thick whose surface was finished smooth.

| | A | B | C | D | E | F | G | H |
|---|---|---|---|---|---|---|---|---|
| Lithium metaphosphate | | 8 | | 10 | 45 | 20 | 30 | 45 |
| Sodium metaphosphate | 14 | 5 | 10 | 10 | | 10 | 10 | |
| Potassium metaphosphate | | | 8 | | | | | |
| Aluminium metaphosphate | | | | | 40 | 30 | 30 | 40 |
| Zinc metaphosphate | | | | 20 | | | 40 | 30 |
| Barium metaphosphate | | | | | 5 | | | |
| Magnesium metaphosphate | 42 | 35 | 30 | 35 | 10 | | | 10 |
| Calcium metaphosphate | 44 | 30 | 25 | 30 | | | | |
| Lead metaphosphate | | | 14 | 15 | 10 | | | |
| Silica | | | | | | 5 | | 5 |
| Thorium oxide | | 30 | 37 | 38 | 30 | | | |
| Uranium oxide | | 0.2 | 0.3 | | | 20 | 20 | 10 |
| Plutonium oxide | | | | 2 | | | 15 | |

Each of the above detectors was subjected under the same conditions in Example 1 to neutron bombardment and subsequent etching. The surface of each detector was observed to present etch pits formed in a corresponding number to the neutron fluence applied thereon.

While the invention has been described in connection with some preferred embodiments thereof, the invention is not limited thereto and includes any modifications and alterations which fall within the true spirit and scope of the invention as defined in the appended claims.

What is claimed is:
1. A vitreous composition for measuring neutron fluences comprising:
   at least one alkali metal metaphosphate selected from the group consisting of lithium metaphosphate, sodium metaphosphate, and potassium metaphosphate;
   at least one metal metaphosphate selected from the group consisting of zinc metaphosphate, calcium metaphosphate, magnesium metaphosphate and aluminium metaphosphate;
   between 8 and 60% by weight of the metaphosphate being alkali metal metaphosphate and between 40 and 92% by weight of the metaphosphate being of said metal metaphosphate;
   and an oxide of fissile material selected from the group consisting of uranium oxide, thorium oxide, plutonium oxide and neptunium oxide;
   said composition containing between 0.1 and 30% by weight of uranium oxide when it is the fissile material;
   between 2 and 60% by weight of thorium oxide when it is the fissile material;
   and between 0.3 and 20% by weight of neptunium oxide or plutonium oxide when they are the fissile material.

2. A vitreous composition according to claim 1 wherein the fissile material is a mixture of uranium oxide and at least one oxide selected from the group consisting of thorium oxide, plutonium oxide and neptunium oxide.

3. A vitreous composition according to claim 1 wherein the fissile material is uranium oxide in the proportions of between 10 and 20% by weight.

4. A vitreous composition according to claim 1 wherein the proportions of fissile material are 20 to 40% by weight for thorium oxide, 0.2 to 20% by weight for uranium oxide, 0.3 to 20% by weight for both neptunium oxide and plutonium oxide.

5. The vitreous composition according to claim 1 including in addition at least one additive selected from the group consisting of boron oxide, silicon oxide, lead metaphosphate, barium metaphosphate and strontium metaphosphate in proportions not in excess of 10% by weight on the basis of the total amount of the alkali metaphosphate and the metal metaphosphate.

References Cited
UNITED STATES PATENTS

| 3,258,317 | 10/1966 | Blair et al. | 250—83 X |
| 3,283,152 | 11/1966 | Yokota et al. | 250—83 X |
| 3,293,433 | 12/1966 | Yokota et al. | 250—83 |
| 3,294,700 | 12/1966 | Bedier et al. | 250—83 X |
| 3,303,085 | 2/1967 | Price et al. | 250—83 X |
| 3,335,278 | 8/1967 | Price et al. | 250—83.1 |
| 3,373,683 | 3/1968 | Alter | 250—83 X |

OTHER REFERENCES

I.R.E. Transactions on Nuclear Science, NS–5(3), January 1958, pages 92–95, "Glass Scintillators," by Ginther et al., TK 900112.

BENJAMIN R. PADGETT, Primary Examiner

M. J. SCOLNICK, Assistant Examiner

U.S. Cl. X.R.

106—47; 250—83.1